March 31, 1964 J. J. PATTON 3,126,974
PROCESS AND APPARATUS FOR WEIGHING A
PREDETERMINED AMOUNT OF MATERIALS
Filed April 27, 1960 5 Sheets-Sheet 1

INVENTOR.
John J. Patton
BY
Jennings, Carter & Thompson
Attorneys

March 31, 1964

J. J. PATTON 3,126,974

PROCESS AND APPARATUS FOR WEIGHING A
PREDETERMINED AMOUNT OF MATERIALS

Filed April 27, 1960

INVENTOR.
John J. Patton

BY
Jennings, Carter & Thompson
Attorneys

March 31, 1964  J. J. PATTON  3,126,974
PROCESS AND APPARATUS FOR WEIGHING A
PREDETERMINED AMOUNT OF MATERIALS
Filed April 27, 1960  5 Sheets-Sheet 4

INVENTOR.
John J. Patton
BY
Jennings, Carter & Thompson
Attorneys

INVENTOR.
John J. Patton
BY
Jennings, Carter & Thompson
Attorneys

United States Patent Office 3,126,974
Patented Mar. 31, 1964

3,126,974
PROCESS AND APPARATUS FOR WEIGHING A PREDETERMINED AMOUNT OF MATERIALS
John J. Patton, 3111 Audubon Road, Montgomery, Ala.
Filed Apr. 27, 1960, Ser. No. 25,016
7 Claims. (Cl. 177—122)

This invention relates to a process and apparatus for weighing a predetermined amount of materials and more particularly to such a process and apparatus which shall be adapted to weigh the predetermined amount of materials from separate sources.

Another object of my invention is to provide a process and apparatus which is particularly adapted for weighing accurately materials having wide ranges in sizes, such as alloy materials, ores and the like, whereby the total amount of material weighed will have the same ratio of large particles to small particles as were present before the material was weighed.

A further object of my invention is to provide a process and apparatus of the character designated in which a predetermined amount of various materials may be mixed together in a single weighing operation whereby the desired proportion of each material is added.

A still further object of my invention is to provide apparatus of the character designated which shall be simple of construction, economical of manufacture and one which is adapted for continuous, automatic operation with a minimum of labor and maintenance required.

As is well known in the art to which my invention relates, it is often desirable to bag materials whereby the filled container will contain an aggregate having the same ratio of large particle size materials to small particle size materials as the original material had before being separated into larger and smaller size materials during the weighing operation. That is, in the bagging operation, the fines become separated from the coarse size particles whereby certain bags will contain parctically all fines and other bags will contain practically all coarse size particles. Where the bag contains all coarse size particles, it is very difficult to weigh the material accurately. Accordingly, it is desirable to have some fine size particles to add to the bag as the final materials added.

To overcome the above and other difficulties, I provide apparatus in which the coarse and fine size particles or any mixture of materials are introduced into a container in a controlled manner whereby any desired ratio of the materials introduced may be obtained. Also, by first introducing large particle size materials into the container until a major portion thereof is filled and then introducing small particle size materials, the materials are weighed accurately without the introduction of large lumps of material at the end of the weighing operation.

Apparatus embodying features of my invention and which may be employed to carry out my improved process is illustrated in the accompanying drawings, in which.

Figure 1:
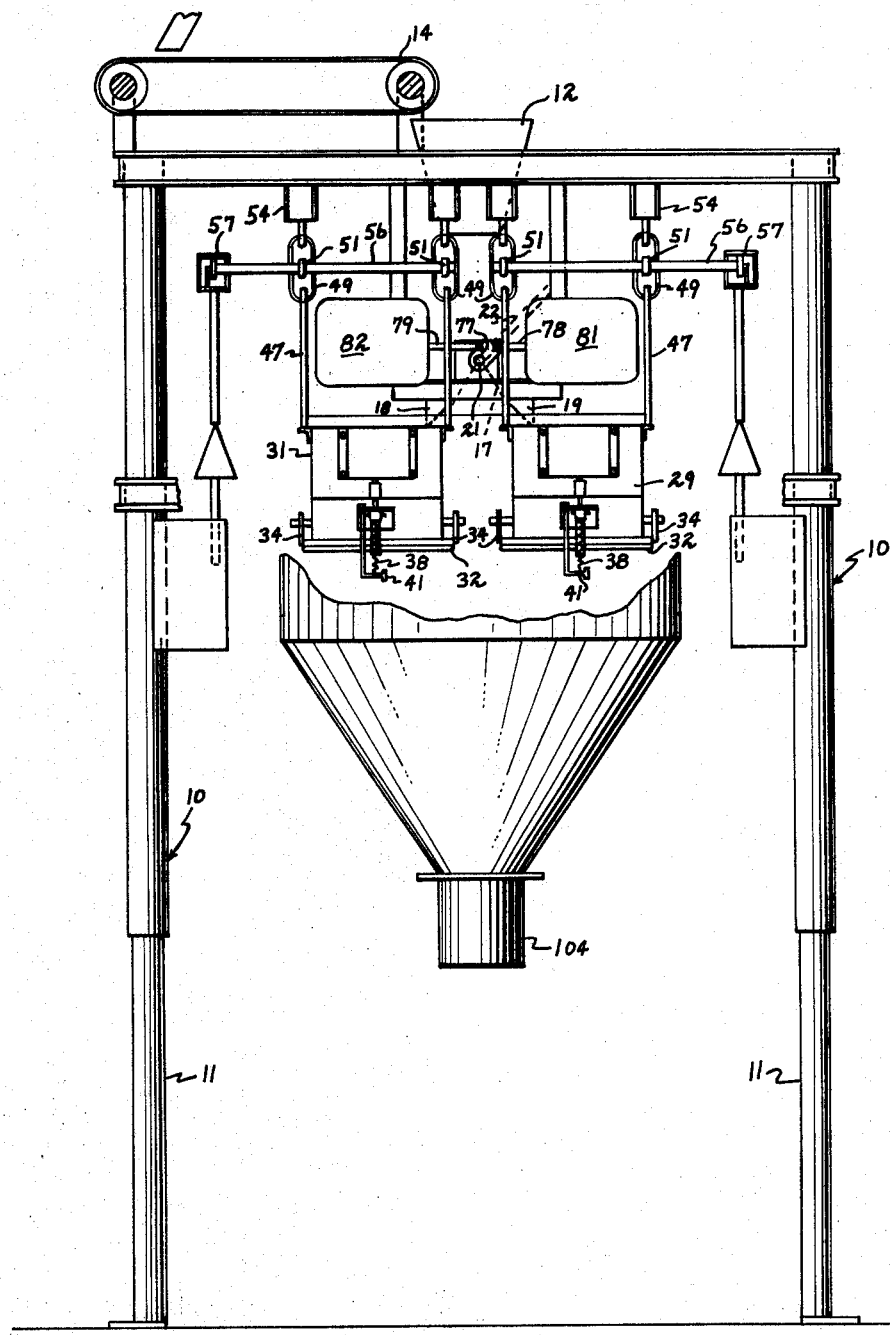
FIG. 1 is a front elevational view, partly broken away and in section.

Referring now to the drawings for a better understanding of my invention, I show a supporting frame 10 which may have extendable leg members 11 whereby the weighing apparatus may be supported at selected elevations. Mounted on the frame 10 is a feed hopper 12 for supplying material from one source, such as coarse size material. Mounted on the frame 10 rearwardly of the feed hopper 12 is a feed hopper 13 for receiving material from another source, such as fine size material. The coarse size materials and fine size materials may be separated from each other by any suitable means and then introduced into the feed hoppers 12 and 13 by suitable feed conveyors indicated at 14 and 16, respectively. While I have described the materials introduced into the feed hoppers 12 and 13 as being coarse and fine size materials, it will be apparent that the materials could be entirely different from each other, such as the different ingredients for a fertilizer or the like.

The feed hopper 12 is provided with an inverted V-shaped bottom, indicated generally at 17 and is provided with laterally disposed discharge chutes 18 and 19 at the left and right sides respectively, as viewed in FIG. 1. Pivotally mounted in the bottom of the hopper 12 between the chutes 18 and 19 on a suitable shaft 21 is a deflector member 22 which is adapted to be moved selectively from one side of the hopper to the other whereby the material may be discharged selectively through the right hand chute 19 and the left hand chute 18. In FIG. 1, the deflector 22 is shown as being in position to direct the material into the chute 18.

Figure 2:
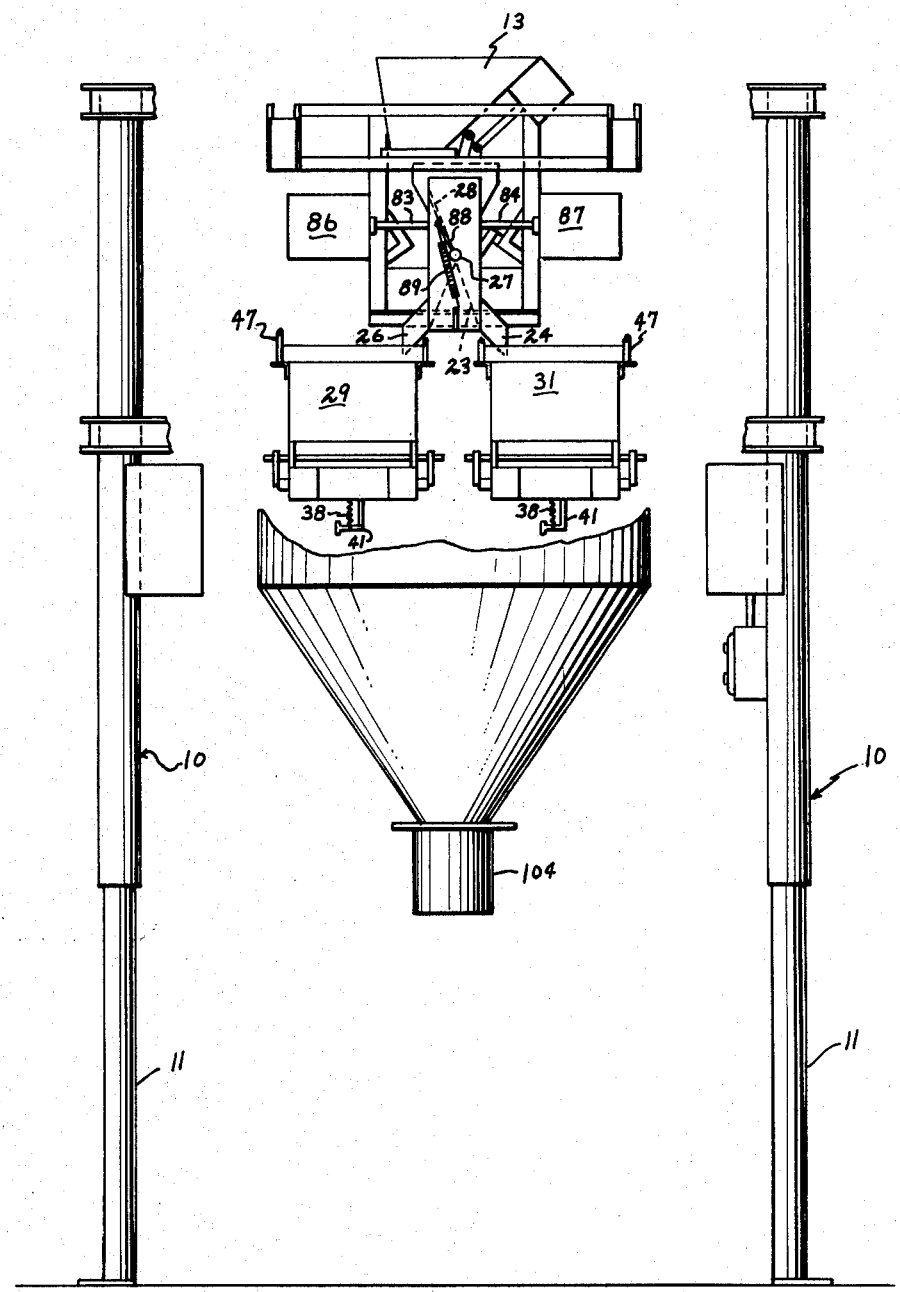
FIG. 2 is a rear elevational view, partly broken away.

As shown in FIG. 2, the feed hopper 13 is also provided with an inverted V-shaped bottom 23 having laterally extending chutes 24 and 26 at the sides thereof. Pivotally mounted in the bottom of the hopper 13 between the chutes 24 and 26 on a suitable shaft 27 is a deflector 28 for selectively introducing the material into the chute 24 and chute 26. In FIG. 2, the deflector is in position to direct the material into the chute 24.

Mounted on the frame 10 beneath the righthand chutes 19 and 26 in position to receive materials discharged therefrom is a righthand weight hopper 29. In like manner, mounted beneath the lefthand chutes 18 and 24 in position to receive materials discharged therefrom is a lefthand weight hopper 31.

Figure 3:
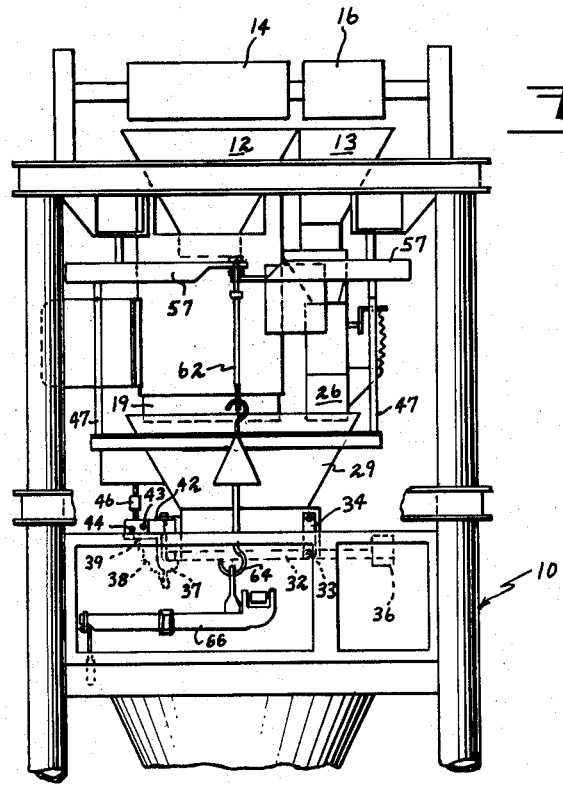
FIG. 3 is a side elevational view, partly broken away.

In view of the fact that the weight hoppers 29 and 31 are identical in construction, a description of one will suffice for both. As shown in FIG. 3, each weight hopper 29 and 31 is provided with a trap door 32 which is mounted for pivotal movement on a shaft 33 supported at the lower ends of brackets 34. The door 32 is urged toward closed position by a counter-weight 36 and is locked in closed position by a suitable latch member indicated generally at 37 which is urged toward locked position by a tension spring 38. That is, one end of the spring 38 is connected to the latch member 37 as at 39 while the other end thereof is secured to the lower end of an L-shaped member 41, as clearly shown in FIGS. 1 and 2. The latch member 37 is pivotally mounted on a suitable bracket 42 by a pivot pin 43. Pivotally connected to the outer end of the latch member 37 by means of a pivot pin 44 is a solenoid 46 for releasing the latch 37 in a manner to be described hereinafter.

Secured to the corners of each of the weight hoppers 29 and 31 are the lower ends of support rods 47. The upper ends of the rods 47 are provided with hook portions 48 which engage suitable loop members 49 carried by horizontally extending brackets 51. The inner ends of the brackets 51 are pivotally connected by pivot pins 52 to loop members 53 which in turn are secured to support brackets 54 carried by the frame 10, as shown in FIG. 1. The outer ends of the brackets 51 are rigidly connected to transverse shafts 56.

Figure 4:
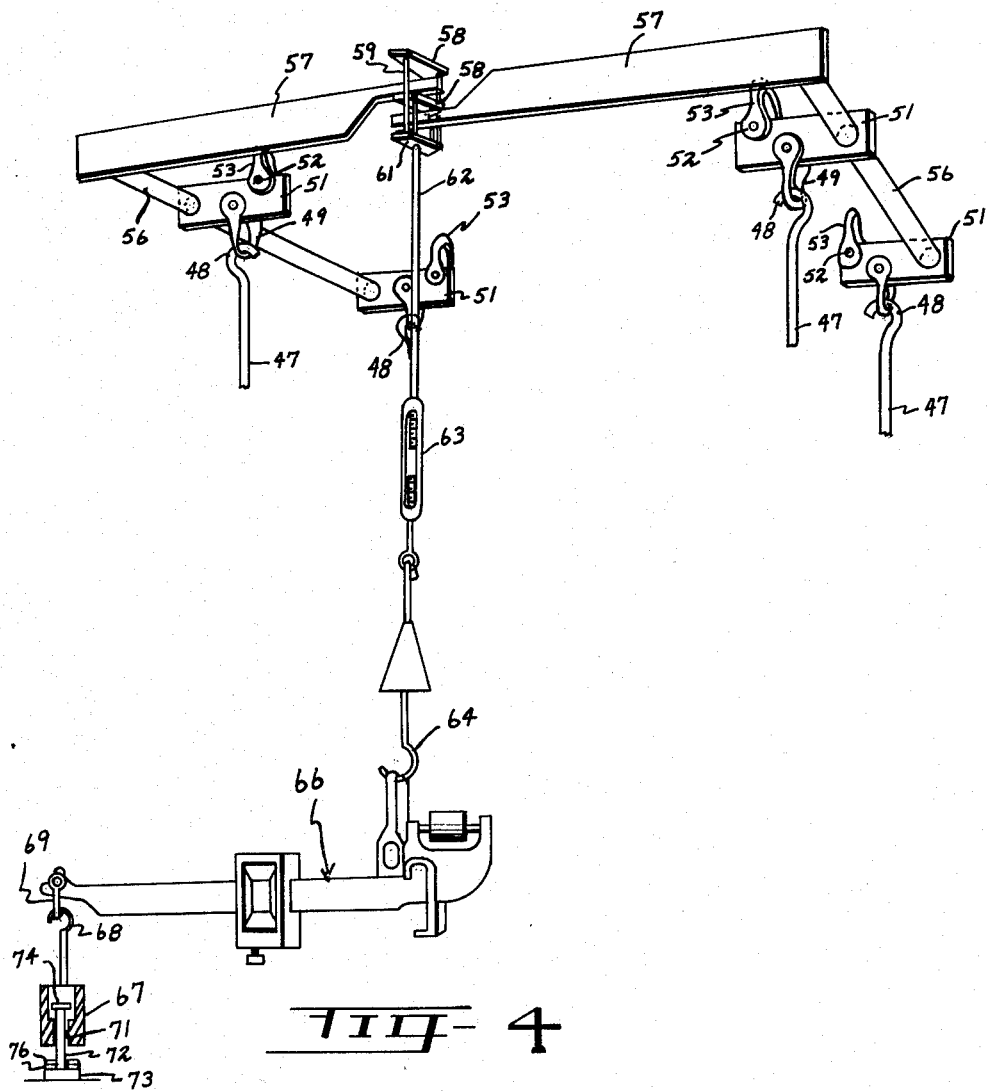
FIG. 4 is an enlarged perspective view, partly broken away and in section, showing the scale unit.

As shown in FIG. 4, the ends of the shafts 56 are rigidly attached to inwardly extending arms 57 which are in position to engage horizontal brackets 58 mounted on vertical rods 59. The lower ends of the rods 59 are secured to a bracket 61 which in turn is secured to a vertical rod 62 having a turnbuckle 63 therein for varying the length. The lower end of the rod 62 is provided with a hook 64 for engaging a weight scale indicated generally at 66.

A weight poise 67 having a hook portion 68 engages the usual loop member 69 provided on the scale 66. The poise 67 is provided with an opening 71 therethrough for receiving a vertical rod 72 of a counter-weight 73. The upper end of the rod 72 is provided with an abutment 74 whereby upon lifting the poise 67 a predetermined height, the abutment 74 engages the poise 67 to thereby lift the counter-weight 73. Additional counter-weights 76 may be inserted around the rod 72 between the counter-weight 73 and poise 67 whereby the overall weight of the counter-weights 73 may be varied. The counter-weight or weight poise 73 thus is ineffective to affect the weight applied by poise 67 until after the poise 67 is lifted a predetermined distance to thereby lift counter-weight 73.

As shown in FIG. 1, the shaft 21 which actuates the deflector 22 is secured to an arm 77 which is pivotally connected to operating arms 78 and 79 of solenoids 81 and 82, respectively. Accordingly, upon moving the arms 78 and 79 to the right, as shown in FIG. 1, the deflector 22 is moved to the right to thereby direct the materials into the left chute 18. As shown in FIG. 2, the shaft 27 which actuates the deflector 28 is operatively connected to operating arms 83 and 84 of solenoids 86 and 87, respectively. Also, secured to the shaft 27 is an outwardly projecting arm 88 having a spring member 89 secured to the outer end thereof. The lower end of the spring 89 is secured to a stationary part of the frame, as shown in FIG. 2, whereby the deflector 28 is urged into firm engagement with the inner sides of the hopper 13 in a manner well understood in the art.

Figure 5:
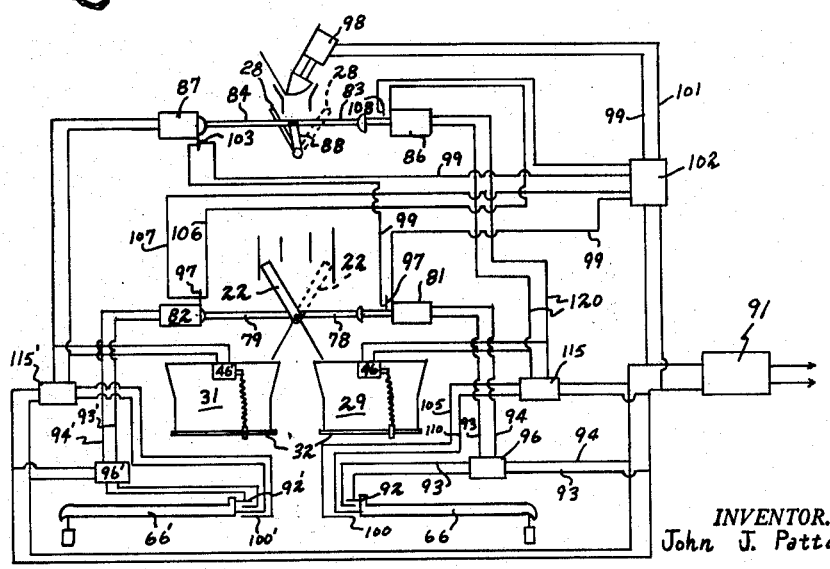
FIG. 5 is a schematic wiring diagram for the apparatus shown in FIGS. 1-4.

Referring now to FIG. 5 of the drawings, the operation of my improved apparatus shown in FIGS. 1–4 will be readily understood. Where coarse materials are to be fed into the weight hoppers 29 and 31 until a major portion of the predetermined weight is obtained and then the fine materials are added to complete the weight, the coarse materials are fed through the chute 19 into the right weight hopper by energizing the master switch 91. That is, the deflector 22 is in the solid line position, as shown in FIG. 5, to thus direct the coarse materials into the right weight hopper 29. As the weight nears the predetermined weight, the scale unit 66 actuates a switch 92 which energizes solenoid 81 through leads 93 and 94 and contactor 96. Upon actuating solenoid 81, rods 78 and 79 are pulled to the right, thereby moving deflector 22 to the dotted line position shown in FIG. 5 to direct the coarse materials into the left weight hopper 31.

As the rod 78 is moved to the right, switch element 97 is closed to thereby energize a solenoid 98 through leads 99 and 101 and contactor 102. Switch element 103 which is in lead 99 is closed at this time whereby circuit is completed to solenoid 98 upon closing switch element 97. The solenoid 98 opens the flow of materials into the chute 13 whereby the fine materials are directed into the right weight hopper 29. The fines continue to flow into the right weight hopper until the predetermined weight is reached. At this time, switch 100 is closed by the movement of scale 66. That is, the counter-weight 73 is lifted from its support after the predetermined weight is reached. Switch 100 energizes solenoid 46, through leads 105 and 110 and contactor 115, to release latch member 37 whereby the drop door 32 is released to discharge materials therefrom. Also, switch 100 energizes solenoid 86 through leads 120 whereby the rods 83 and 84 are moved to the right, thereby moving deflector 28 to the dotted line position whereby material is discharged through chute 13 into the left weight hopper 31. At the same time, circuit to solenoid 98 is broken by the opening of switch 103 as rod 84 moves to the right.

With the door 32 in the right weight hopper 29 opened, materials flow from the right weight hopper into a suitable container mounted beneath a discharge spout 104. After the materials have been discharged from the right weight hopper 29, the counter-weight 36 urges the door 32 toward closed position. Also, as soon as materials start falling from the right weight hopper 29, right scale 66 returns to its original position whereby the counter-weight 73 rests on its support member and weight poise 67 moves the scale to a position to open both switches 92 and 100, thereby de-energizing solenoids 46 and 81. Door 32 thus remains in closed position.

After the deflector 22 is moved to discharge materials into the left weight hopper 31, the materials continue to flow into the left weight hopper until switch 92' associated with the left scale 66' is closed. It will be understood that the switch 92' is closed after a predetermined amount of materials have been added to the weight hopper and before the total predetermined amount of weight has been added. Switch 92' energizes solenoid 82, through leads 93' and 94' and contactor 96', whereby rod 79 moves deflector 22 to the solid line position shown in FIG. 5 whereby the materials are again directed to the right weight hopper 29. Solenoid 98 is then actuated whereby fine materials begin to flow into the left weight hopper 31. That is, switch 97' is closed as the rod 79 is moved to the left whereby circuit is completed to the solenoid 98 through leads 106 and 107. Switch element 108 in lead 106 is closed as the rods 84 and 83 are moved to the right, as shown in FIG. 5, thereby completing circuit through the contactor 102 to the solenoid 98 whereby the materials are discharged through the chute 13 into the left weight hopper.

After the predetermined weight is introduced into the weight hopper 31, the switch element 100' is actuated as the counter-weight 73 is lifted from its support, thereby energizing the solenoids 46' and 87 whereby the trap door 32 for the left weight hopper 31 is released and the deflector 28 is returned to the solid line position to direct materials into the right weight hopper. Solenoid 98 is de-energized due to the fact that switch element 108 is open when the rods 83 and 84 move to the left, as viewed in FIG. 5. The materials thus flow alternately into the right weight hopper and then the left weight hopper whereby the apparatus may be operated automaticaly to weight predetermined amounts of materials into the weight hoppers.

Figure 8:
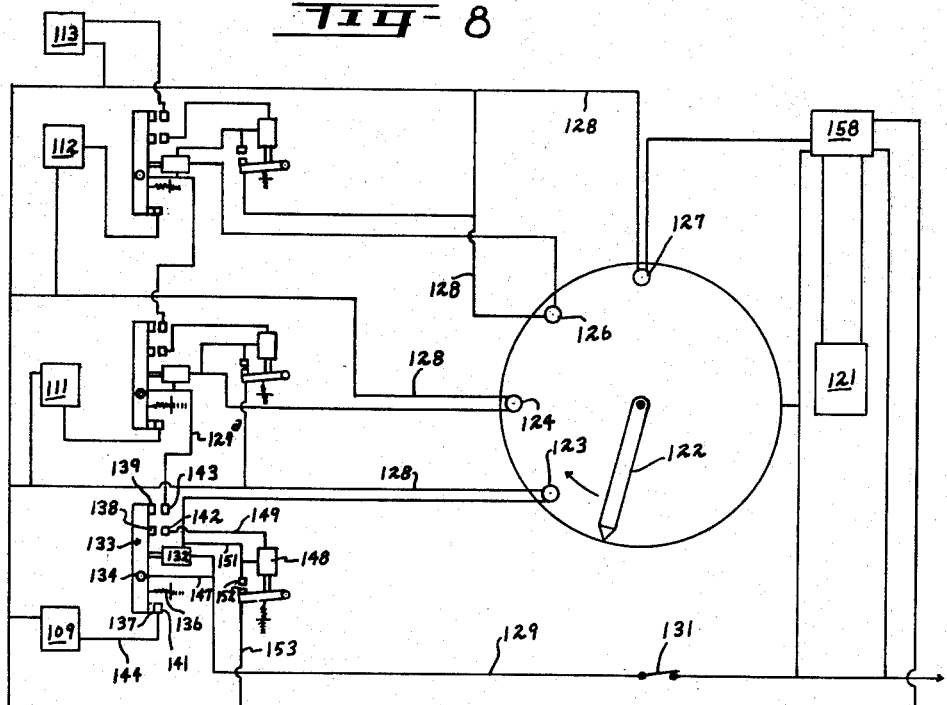
Figure 7:
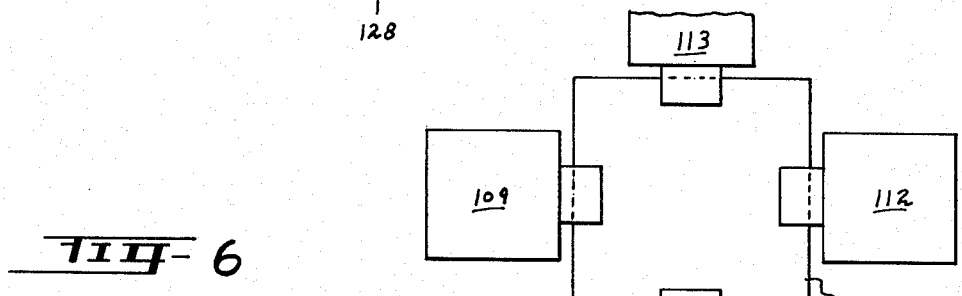
FIG. 7 is a plan view, partly broken away, of the apparatus shown in FIG. 6, and, FIG. 8 is a schematic wiring diagram for the apparatus shown in FIGS. 6 and 7.
Figure 6:
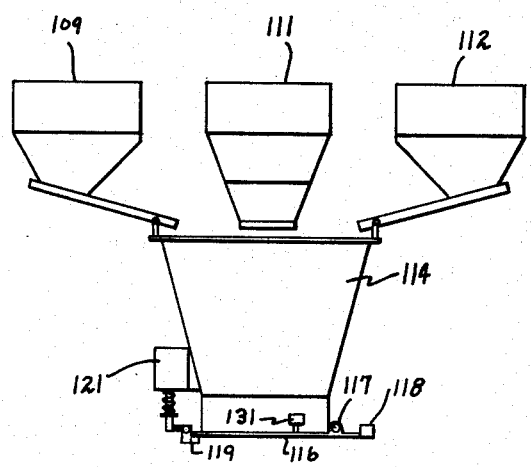
FIG. 6 is a side elevational view showing a modified form of my apparatus.

In FIGS. 6, 7 and 8 of the drawings, I show a modified form of my invention in which I employ a series of supply hoppers indicated at 109, 111, 112 and 113. The supply hoppers are adapted to discharge materials into a common weight hopper indicated generally at 114. A suitable trap door 116 is pivotally mounted adjacent the bottom of the weight hopper 114 by a pivot pin 117.

Also, a counter-weight 118 urges the door 116 toward closed position. A latch 119 holds the door 116 in closed position and the latch 119 is actuated by a solenoid 121.

Instead of employing a weight beam 66 in FIGS. 6-8, I provide a rotary indicator 122 which is rotated in response to the addition of weight to the weight hopper 114. That is, as material is added to the weight hopper 114, the indicator 122 rotates. Mounted at selected angular positions relative to the rotary indicator 122 are a series of contact members, such as electric eyes 123, 124, 126 and 127. Circuit is supplied to one side of each contact 123, 124, 126 and 127 through a lead 128. The circuit is completed to contact 123 through a lead 129 having a switch 131 therein, lead 129 is in circuit with a solenoid 132 which is operatively connected to a lever member 133 by a pivot pin 134 whereby upon energizing the solenoid 132, the lever 133 overcomes the tension of a spring 136 to move in a clockwise direction, as viewed in FIG. 8. Lever arm 133 carries contact members 137, 138 and 139 which are adapted to engage contact members 141, 142 and 143, respectively. The contact member 141 is connected to a lead 144 which in turn is connected to the feeder 109. The other side of feeder 109 is connected to lead 128.

Upon closing the switch 131, circuit is completed to the feeder 109 through leads 128 and 129 due to the fact that the contacts 137, 138 and 139 are electrically connected to each other and to a branch line 147 which in turn is connected to lead 129. As the weight in the hopper 114 increases, the rotary indicator 122 moves from the zero position toward the contact 123. When the rotary indicator 122 reaches contact 123 circuit is completed to solenoid 132 through lines 128 and 129 and contact 123. Upon energizing solenoid 132, lever arm 133 is moved in a clockwise direction, as viewed in FIG. 8, whereby contacts 137 and 141 move away from each other to break the circuit to feeder 109. At the same time, contacts 138 and 139 move into engagement with contacts 142 and 143, respectively, to thereby complete the circuit to a solenoid 148 through leads 149 and 151. When solenoid 148 is energized, a pair of contacts 152 engage each other to form a holding circuit whereby circuit is completed to the line 151 through a line 153. Solenoid 132 is thus energized after the rotary indicator 122 passes the contact 123. That is, solenoid 132 remains energized after contact 123 is broken.

Upon closing contacts 139—143, circuit is completed to the next feeder 111 through a conduit 129ª. The electrical circuit for de-energizing the feeder 111 and completing the circuit to the next feeder 112 is identical to the circuit described with relation to feeder 109. That is, upon breaking the circuit to the feeder 111, the circuit is completed to feeder 112 and upon breaking the circuit to feeder 112, circuit is completed to another feeder 113.

Feeder 113 continues to feed material into the weight hopper 114 until contact 127 is closed. Upon closing contact 127, contactor 158 is energized to thereby energize solenoid 121, which releases door latch 119 whereby door 116 opens to discharge the material from the weight hopper 114. As the door 116 starts opening, switch 131 is opened thereby breaking circuit to all electrical components. Springs 136 then return all of the arms 133 to the position shown in FIG. 8 whereby the apparatus is in position to begin another cycle. After the material is discharged from the weight hopper, indicator 122 returns to zero and the weight hopper door 116 is closed by counter-weight 118 to thereby start feeder 109 for a new cycle.

The contacts 123, 124, 126 and 127 may be adjustable for variation whereby different weights may be introduced into the weight hopper 114 before the various feeders are de-energized. While I show four contacts in position to be engaged by the rotary indicator 122, it will be obvious that any number of such contacts may be employed.

From the foregoing, it will be seen that I have devised improved apparatus for weighing materials whereby the materials added are weighed accurately with a minimum of apparatus and a minimum of labor. By providing means for interrupting the supply of materials from one feed hopper and then introducing a predetermined amount of materials from at least one other hopper, any desired ratio of materials may be added to a weight hopper. My apparatus is particularly adapted for weighing accurately composite mixtures of fertilizers and ores and aggregates for building materials.

While I have shown my invention in two forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. Apparatus for weighing a predetermined amount of materials from separate sources comprising a first weight hopper, a second weight hopper, a first deflector disposed to deflect materials from one source into said first weight hopper when in one position and disposed to deflect said materials from said one source into said second weight hopper when in another position, means to move said first deflector selectively from said one position to said another position after a portion of said predetermined amount is added and before all of said predetermined amount has been added to said first weight hopper and said second weight hopper respectively, whereby the supply of materials from said one source to said first weight hopper and said second weight hopper is interrupted, a second deflector disposed to deflect materials from another source into said first weight hopper when in one position and disposed to deflect said materials from said another source into said second weight hopper when in another position, means to move said second deflector selectively from said one position to said another position after said predetermined amount of materials have been added to said first weight hopper and said second weight hopper respectively.

2. Apparatus for weighing a predetermined amount of materials as defined in claim 1 in which the means to move said first deflector selectively from said one position to said another position comprises a weight scale operatively connected to said first weight hopper, a weight scale operatively connected to said second weight hopper and means operatively connecting the weight scales to said first deflector.

3. Apparatus for weighing a predetermined amount of materials as defined in claim 2 in which the means to move said second deflector selectively from said one position to said another position comprises means operatively connecting said weight scales to said second deflector.

4. Apparatus for weighing a predetermined amount of materials as defined in claim 2 in which an electrical switch element is operatively connected to each of said scales and said first deflector whereby each switch element and said first deflector is actuated after a portion of said predetermined amount of materials is added and before all of said predetermined amount has been added to its associated weight hopper.

5. Apparatus for weighing a predetermined amount of materials as defined in claim 4 in which a second electrical switch element is operatively connected to each of said scales and said second deflector whereby said second deflector and second switch element is actuated after said predetermined amount of materials have been added to its associated weight hopper.

6. Apparatus for weighing a predetermined amount of materials as defined in claim 1 in which the means to move said first deflector and said second deflector selectively from one position to another position comprises a weight scale operatively connected to said first weight hopper, a weight scale operatively connected to said second weight hopper, means operatively connecting the weight scales to said first deflector, means operatively connecting said weight scales to said second deflector, a first weight poise for each of said scales adapted to be lifted after a portion of said predetermined amount is added and before all of said predetermined amount has been added to its associated weight hopper, a second weight poise for each of said scales disposed to become effective after said first weight poise associated therewith is lifted and adapted to be lifted after said predetermined amount has been added to its associated weight hopper whereby the added weight of said second weight poise controls the amount of materials added after said portion is added.

7. Apparatus for weighing a predetermined amount of materials as defined in claim 6 in which electrically controlled operating means for moving said first deflector is actuated when said first weight poise is lifted and electrically controlled operating means for moving said second deflector is actuated when said second weight poise is lifted.

References Cited in the file of this patent

UNITED STATES PATENTS

| | | |
|---|---|---|
| 565,224 | Richards | Aug. 4, 1896 |
| 2,669,412 | Nowak | Feb. 16, 1954 |